(12) United States Patent
Sagawa

(10) Patent No.: US 12,194,716 B2
(45) Date of Patent: Jan. 14, 2025

(54) DECORATIVE SHEET, DECORATIVE MATERIAL, AND METHOD OF PRODUCING DECORATIVE SHEET

(71) Applicant: TOPPAN INC., Tokyo (JP)

(72) Inventor: Koichi Sagawa, Tokyo (JP)

(73) Assignee: TOPPAN INC., Tokyo (JP)

( * ) Notice: Subject to any disclaimer, the term of this patent is extended or adjusted under 35 U.S.C. 154(b) by 0 days.

(21) Appl. No.: 18/372,981

(22) Filed: Sep. 26, 2023

(65) Prior Publication Data

US 2024/0017530 A1    Jan. 18, 2024

Related U.S. Application Data

(63) Continuation of application No. PCT/JP2022/012291, filed on Mar. 17, 2022.

(30) Foreign Application Priority Data

Mar. 29, 2021 (JP) ................ 2021-054874

(51) Int. Cl.
| | | |
|---|---|---|
| B32B 3/00 | (2006.01) | |
| B32B 7/12 | (2006.01) | |
| B32B 27/08 | (2006.01) | |
| B32B 27/20 | (2006.01) | |
| B32B 27/32 | (2006.01) | |
| B41M 7/00 | (2006.01) | |

(52) U.S. Cl.
CPC ............ *B32B 27/08* (2013.01); *B32B 7/12* (2013.01); *B32B 27/20* (2013.01); *B32B 27/32* (2013.01); *B41M 7/0027* (2013.01); *B32B 2255/10* (2013.01); *B32B 2255/26* (2013.01); *B32B 2255/28* (2013.01); *B32B 2307/4023* (2013.01); *B32B 2307/4026* (2013.01); *B32B 2307/412* (2013.01); *B32B 2307/712* (2013.01); *B32B 2451/00* (2013.01)

(58) Field of Classification Search
None
See application file for complete search history.

(56) References Cited

U.S. PATENT DOCUMENTS

| | | |
|---|---|---|
| 2016/0107191 A1 | 4/2016 | Scheible et al. |
| 2018/0282534 A1 | 10/2018 | Ono et al. |
| 2019/0248100 A1* | 8/2019 | Horio .............. B32B 9/042 |

FOREIGN PATENT DOCUMENTS

| | | |
|---|---|---|
| JP | H07-232424 A | 9/1995 |
| JP | H09-267444 A | 10/1997 |
| JP | H10-16168 A | 1/1998 |

(Continued)

OTHER PUBLICATIONS

JP-2001192995-A (Year: 2001).*

(Continued)

*Primary Examiner* — Elizabeth E Mulvaney
(74) *Attorney, Agent, or Firm* — Foley & Lardner LLP

(57) ABSTRACT

A decorative material includes a substrate and a decorative sheet laminated on at least one surface of the substrate, the decorative sheet including a printing substrate layer, a pattern layer laminated on one surface of the printing substrate layer, and a surface protective layer laminated on a surface of the pattern layer opposite to a surface facing the printing substrate layer, and the surface protective layer having an antiviral agent and a fluorochrome added thereto.

5 Claims, 2 Drawing Sheets

(56) References Cited

FOREIGN PATENT DOCUMENTS

| JP | 2000-272057 A | 10/2000 |
| JP | 2006-274149 A | 10/2006 |
| JP | 2011-201323 A | 10/2011 |
| JP | 2015-080887 A | 4/2015 |
| JP | 2017-042930 A | 3/2017 |
| JP | 2017-088509 A | 5/2017 |
| JP | 2019-025918 A | 2/2019 |

OTHER PUBLICATIONS

Office Action issued in corresponding Japanese Patent Application No. 2021-054874 dated Aug. 3, 2021 (6 pages).
International Searching Authority, "International Search Report," issued in connection with International Patent Application No. PCT/JP2022/012291, dated May 24, 2022.
International Searching Authority, "Written Opinion," issued in connection with International Patent Application No. PCT/JP2022/012291, dated May 24, 2022.
European Extended Search Report issued in corresponding European Patent Application No. 22780177.6 dated Sep. 9, 2024 (4 pages).

\* cited by examiner

DECORATIVE SHEET, DECORATIVE MATERIAL, AND METHOD OF PRODUCING DECORATIVE SHEET

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2022/012291, filed on Mar. 17, 2022, which is based upon and claims the benefit of priority to Japanese Patent Application No. 2021-054874, filed on Mar. 29, 2021; the disclosures of which are incorporated herein by reference in their entirety.

TECHNICAL FIELD

The present invention relates to a decorative sheet and a decorative material which are used, for example, as construction materials such as general fittings, and to a method for producing the decorative sheet.

BACKGROUND

As a decorative sheet, there is, for example, a decorative sheet disclosed in PTL 1 which includes an outermost surface formed of a coating resin having a silver-based inorganic additive or a zinc-based inorganic additive blended therein and is thereby constituted to have antiviral properties.

CITATION LIST

Patent Literature

[PTL 1] JP 2015-80887 A.

SUMMARY OF THE INVENTION

Technical Problem

The decorative sheet disclosed in PTL 1 is constituted to have antiviral properties and has an appearance copying that of natural materials such as a wood grain and a stone grain, and it is therefore difficult to clearly indicate on the surface of a product by characters, numbers, symbols, or the like that the product has antimicrobial properties or antiviral properties.

Therefore, a problem with such a decorative sheet has been that when a decorative sheet having neither antimicrobial properties nor antiviral properties is, due to unavoidable occurrences such mistakes, used in a location where the antimicrobial properties or the antiviral properties are needed, it is impossible to confirm the properties of the decorative sheet nondestructively.

In view of this problem, an object of the present invention is to provide a decorative sheet, a decorative material, and a method of producing a decorative sheet, in which the decorative sheet can, nondestructively, be confirmed to have antimicrobial properties or antiviral properties by visual inspection.

Solution to Problem

In order to solve the problem, an aspect of the present invention is a decorative sheet including a printing substrate layer, a pattern layer laminated on one surface of the printing substrate layer, and a surface protective layer laminated on a surface of the pattern layer opposite to a surface facing the printing substrate layer. The surface protective layer has at least one of an antimicrobial agent or an antiviral agent, and a fluorochrome added thereto.

To solve the problem, another aspect of the present invention is a decorative sheet including a pattern layer, a printing substrate layer laminated on one surface of the pattern layer and formed using a transparent resin, and a surface protective layer laminated on a surface of the printing substrate layer opposite to a surface facing the pattern layer. The surface protective layer has at least one of an antimicrobial agent or an antiviral agent, and a fluorochrome added thereto.

To solve the problem, another aspect of the present invention is a decorative material including a substrate and a decorative sheet laminated on at least one surface of the substrate.

To solve the problem, another aspect of the present invention is a method of producing a decorative sheet including a printing substrate layer, a pattern layer laminated on one surface of the printing substrate layer, and a surface protective layer laminated on a surface of the pattern layer opposite to a surface facing the printing substrate layer. When at least one of an antimicrobial agent or an antiviral agent is added to the surface protective layer, a fluorochrome is added to the surface protective layer. On the other hand, when an antimicrobial agent or an antiviral agent is not added to the surface protective layer, no fluorochrome is added to the surface protective layer.

In order to solve the problem, another aspect of the present invention is a method of producing a decorative sheet including a pattern layer, a printing substrate layer laminated on one surface of the pattern layer and formed using a transparent resin, and a surface protective layer laminated on a surface of the printing substrate layer opposite to a surface facing the pattern layer. When at least one of an antimicrobial agent or an antiviral agent is added to the surface protective layer, a fluorochrome is added to the surface protective layer. On the other hand, when an antimicrobial agent or an antiviral agent is not added to the surface protective layer, no fluorochrome is added to the surface protective layer.

Advantageous Effects of the Invention

According to the aspects of the present invention, it is possible to provide a decorative sheet, a decorative material, and a method of producing a decorative sheet, in which the decorative sheet can, nondestructively, be confirmed to have antimicrobial properties or antiviral properties by visual inspection.

DETAILED DESCRIPTION

Figure 1:
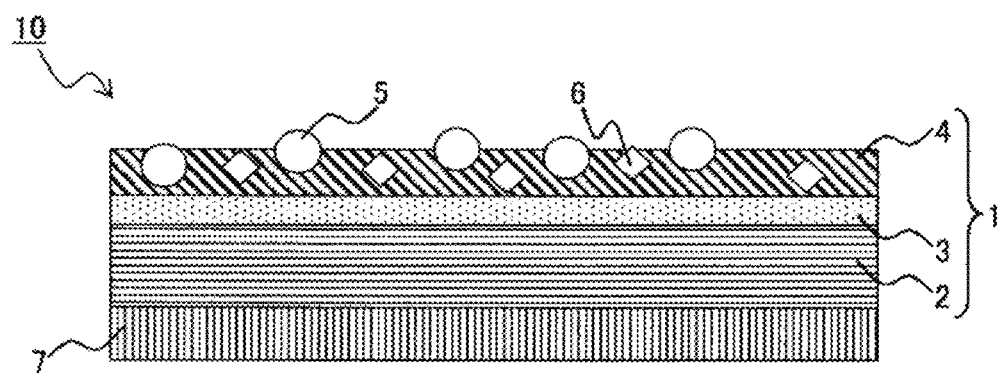
FIG. 1 is a cross-sectional view of a structure of a decorative sheet and a decorative material according to a first embodiment of the present invention.

Hereinafter, embodiments of the present technique are described with reference to the drawings. In the drawings, components identical with or similar to each other are given the identical or similar reference signs, and repetitive description is omitted. The drawings are schematic and include components different from those in real cases. The embodiments described below exemplify a device or a method for embodying the technical idea of the present technique. The technical idea of the present technique is not limited to devices or methods described in the embodiments. The technical idea of the present technique can be modified variously within the technical scope set forth in the claims. The "left and right" and "upper and lower" directions in the following description are merely a definition for convenience of explanation, and do not restrict the technical idea of the present invention. Therefore, for example, "left and right" and "upper and lower" may be read the other way around when the paper sheet is rotated by 90 degrees. Needless to say, "left" becomes "right" while "right" becomes "left" when the paper sheet is rotated by 180 degrees.

First Embodiment

Hereinafter, the structure of a decorative material 10 is described with reference to FIG. 1.

As shown in FIG. 1, the decorative material 10 includes a decorative sheet 1 and a substrate 7. The specific structure of the decorative sheet 1 is described later.

The substrate 7 is formed in a tabular shape, using, for example, a wooden board, an inorganic board, or a metal plate, and the decorative sheet 1 is laminated on one surface (upper surface in FIG. 1) of the substrate. That is, the decorative material 10 includes the substrate 7 and the decorative sheet 1 laminated on one surface of the substrate 7.

Structure of Decorative Sheet

As shown in FIG. 1, the decorative sheet 1 includes a printing substrate layer 2, a pattern layer 3, and a surface protective layer 4.
<Printing Substrate Layer>

The printing substrate layer 2 is formed using a thermoplastic resin.

As the thermoplastic resin forming the printing substrate layer 2, it is possible to use, for example, a colored thermoplastic polyolefin-based resin. As the polyolefin-based resin, it is possible to use, for example, a single one, or a mixture, copolymer, composite, or laminate of two or more from among, for example, polyolefin-based resins including: polyolefin resins such as polyethylene, polypropylene, polymethylpentene, polybutene, an ethylene-propylene copolymer, an ethylene-α-olefin copolymer, and a propylene-α-olefin copolymer; and olefin-based copolymer resins such as an ethylene-vinyl acetate copolymer, an ethylene-vinyl alcohol copolymer, an ethylene-(meth)acrylic acid (ester) copolymer, and a metal neutralized product of an ethylene-unsaturated carboxylic acid copolymer (ionomer).

The polyolefin-based resin can be selected as appropriate for use from among the types of resins described above according to the purpose of use of the decorative sheet 1. Particularly, the most suitable polyolefin-based resin for general use is a polypropylene-based resin, that is, a homopolymer or a copolymer containing propylene as a main component. For example, a homopolypropylene resin, a random polypropylene resin, and a block polypropylene resin may be used alone or blended as appropriate, and further, a resin or the like in which atactic polypropylene is blended as appropriate can be used. The polyolefin-based resin may be a copolymer containing an olefin-based monomer other than propylene, and it is possible to use, for example, a propylene-α-olefin copolymer having a crystalline polypropylene portion and containing 15 mol % or more of one or more comonomers from among α-olefins, other than propylene, with 2 to 20 carbon atoms, preferably ethylene, butene-1,4-methylpentene-1, hexene-1, or octene-1. It is also possible to add as appropriate a modifier, which is typically used for softening a polypropylene-based resin, such as low density polyethylene, an ethylene-α-olefin copolymer, ethylene-propylene copolymer rubber, ethylene-propylene-non-conjugated diene copolymer rubber, a styrene-butadiene copolymer, and a hydrogenated product.

The printing substrate layer 2 may also have added thereto as necessary one or more additives selected from various additives such as a colorant, a filler, an ultraviolet absorber, a light stabilizer, a heat stabilizer, an antioxidant, an antistatic agent, a lubricant, a flame retardant, an antimicrobial agent, an antifungal agent, an antifriction agent, a light scattering agent, and a gloss adjusting agent.

The printing substrate layer 2 has a thickness in a range of preferably 40 [μm] or more and 150 [μm] or less, more preferably 50 [μm] or more and 130 [μm] or less. This is because the printing substrate layer 2 having a thickness of 40 [μm] or more absorbs unevenness, bumps, and the like of a floor material or the like to be a base and enables the decorative sheet 1 to have good finishing of work. This is because the printing substrate layer 2 having a thickness of 150 [μm] or less has not been formed thicker than necessary and enables reduction of production costs of the decorative sheet 1.
<Pattern Layer>

The pattern layer 3 is laminated on one surface (upper surface in FIG. 1) of the printing substrate layer 2, and is a layer for adding a motif imparting designability. The formation of the pattern layer 3 can be omitted when coloring of the printing substrate layer 2 can be substituted for the pattern layer.

The pattern layer 3 is formed using printing ink, paint, or the like. The printing ink, the paint, or the like forming the pattern layer 3 is formed by dissolving or dispersing a colorant, such as a dye and a pigment, together with an appropriate binder resin in an appropriate diluent solvent.

The printing ink, the paint, or the like forming the pattern layer 3 may be applied, for example, by various printing methods such as a gravure printing method and an offset printing method, or by various coating methods such as a gravure coating method and a roll coating method.

As the binder resin, it is possible to use, for example, a urethane-based resin, an acrylic resin, a vinyl chloride acetate-based resin, a polyimide-based resin, nitrocellulose, or a mixture thereof. The binder resin, however, is not limited to these examples.

Any motif can be used as the motif, and it is possible to use, for example, a wood grain pattern, a stone grain pattern, a fabric grain pattern, an abstract pattern, a geometric pattern, a character, a symbol, a monochromatic color, or a combination thereof. Further, a concealing layer may be disposed between the pattern layer 3 and the printing substrate layer 2 to improve the concealing properties of the decorative sheet 1. The concealing layer is formed using, for example, an opaque printing ink or paint containing a large amount of an opaque pigment such as titanium dioxide or iron oxide.

The pattern layer 3 preferably has a thickness in a range of 1 [μm] or more and 10 [μm] or less. This is because when the pattern layer 3 has a thickness of 1 [μm] or more, print clarity can be improved. Also, when the pattern layer 3 has a thickness of 10 [μm] or less, printing workability in production of the decorative sheet 1 is improved and the production costs can be reduced.

The pattern layer 3 may have added thereto functional additives, such as an extender, a plasticizer, a dispersant, a surfactant, a tackifier, an adhesion aid, a desiccant, a curing agent, a curing accelerator, and a curing retarder, to impart various functions.

Further, in order to, for example, conceal the color and the pattern of a base to which the decorative sheet 1 is attached, the pattern layer 3 may have a structure including a solid-colored printing substrate layer and a motif pattern layer for adding a motif imparting designability.

<Surface Protective Layer>

The surface protective layer 4 is laminated on one surface (upper surface in FIG. 1) of the pattern layer 3. That is, the surface protective layer 4 is laminated on a surface of the pattern layer 3 opposite to a surface facing the printing substrate layer 2. The surface protective layer 4 is a layer disposed to impart functions, such as weather resistance, scratch resistance, stain resistance, and designability, to the decorative sheet 1.

The surface protective layer 4 is formed using, for example, an acrylic resin composition.

The surface protective layer 4 may, as necessary, contain, for example, various additives such as a weather resistant agent, a plasticizer, a stabilizer, a filler, a dispersant, a colorant (a dye, a pigment, and the like), a solvent, an ultraviolet absorber, a heat stabilizer, a light stabilizer, an anti-blocking agent, a catalyst scavenger, a colorant, a light scattering agent and a gloss adjusting agent. The surface protective layer 4 may also, as necessary, contain, for example, functional additives such as an antimicrobial agent and an antifungal agent.

The surface protective layer 4 further has an antiviral agent 5 and a fluorochrome 6 added thereto.

<Antiviral Agent>

As the antiviral agent added to the surface protective layer 4, it is possible to use, for example, an inorganic antimicrobial agent such as antimicrobial zeolite, antimicrobial apatite, antimicrobial zirconia, and antimicrobial silica formed by mixing a metal, such as silver, copper, and zinc, in a substance, such as zeolite, apatite, zirconia, and silica, as an inorganic compound, and then pulverizing the mixture to introduce the metal into the substance.

As the antiviral agent, it is possible to use, for example, zinc pyrithione, 2-(4-thiazolyl)-benzimidazole, 10,10-oxybisphenoxazine, an organic nitrogen sulfur halogenated compound, or pyridine-2-thiol-oxide.

In the first embodiment, a case is described in which the antiviral agent added to the surface protective layer 4 is an antiviral agent formed using a silver-based material.

The antiviral agent may be constituted to be supported by an inorganic material.

The added amount of the antiviral agent in the surface protective layer 4 is in a range of 0.2 parts by mass or more and 15 parts by mass or less relative to the solid content of the surface protective layer 4. The is because with the added amount of the antiviral agent being 0.2 parts by mass or more, the antiviral agent acts effectively and the antiviral properties are improved, and with the added amount of the antiviral agent being 15 parts by mass or less, the scratch resistance is improved.

The antiviral agent has an average particle size in a range of 0.5 times or more and 2 times or less the thickness of the surface protective layer 4. That is, with the average particle size of the antiviral agent defined as $\varphi$ and the thickness of the surface protective layer 4 as D, the expression $0.5 \leq \varphi \leq 2D$ is satisfied. This is because with the antiviral agent having an average particle size in a range of 0.5 times or more and 2 times or less the surface protective layer 4, the antiviral properties are improved due to the increase of the contact area between the antiviral agent and the surface protective layer 4 and the increase of the surface area of the antiviral agent itself.

The antiviral agent has an average particle size in a range of 1 [μm] or more and 10 [μm] or less. This is because with the antiviral agent having an average particle size of 1 [μm] or more, the antiviral properties are improved due to the increase of the contact area between the antiviral agent and the surface protective layer 4, and with the antiviral agent having an average particle size of 10 [μm] or less, the scratch resistance is improved.

The antiviral agent includes a plurality of peaks in the particle size distribution.

Specifically, the antiviral agent includes two peaks of particle size. The two peaks include a first peak in a range of 1 [μm] or more and 5 [μm] or less, and a second peak in a range of 5 [μm] or more and 10 [μm] or less.

Here, the value of the second peak is set larger than that of the first peak. The antiviral agent including a plurality of peaks of particle sizes further improves the filling density thereof and a larger quantity can be added. Therefore, the antiviral properties are improved due to the increase of the contact area between the antiviral agent and the surface protective layer 4 and the increase of the surface area of the antiviral agent itself.

Further, in the decorative sheet 1 according to the first embodiment, the surface protective layer 4, which is the outermost surface of the decorative sheet 1, may also contain a silicone-based component (e.g., a silicone resin) or a fluorine-based component (e.g., a fluororesin) to, for example, improve the stain resistance.

When the surface protective layer 4 contains a silicone resin, modified silicone is preferably used as the silicone resin due to the issues of adhesiveness and compatibility with surroundings.

When a curable resin forming the surface protective layer 4 is formed from an ultraviolet curable resin or an electron beam curable resin, the modified silicone is preferably an ionizing-radiation reactive modified silicone resin.

When the curable resin forming the surface protective layer 4 is formed from a thermosetting resin, the modified silicone is preferably a thermally reactive modified silicone resin.

When the curable resin forming the surface protective layer 4 is formed from a mixture of an ionizing-radiation curable resin and a thermosetting resin, the modified silicone is preferably a modified silicone resin having at least one of ionizing-radiation reactiveness or thermal reactiveness.

The modified silicone is classified into reactive modified silicone and non-reactive silicone.

Examples of the thermally reactive modified silicone can include monoamine-modified silicones, diamine-modified silicones, epoxy-modified silicones, carbinol-modified silicones, carboxy-modified silicones, mercapto-modified silicones, silanol-modified silicones, alcohol-modified silicones, and diol-modified silicones.

Examples of the ionizing-radiation reactive modified silicone can include acrylic-modified silicone and methacrylic-modified silicone. Examples of the non-reactive modified silicone can include polyether-modified silicones, aralkylmodified silicones, long-chain alkyl-modified silicones, and higher fatty acid ester-modified silicones.

Examples of a production maker of modified silicone include Shin-Etsu Chemical Co., Ltd., Toray Dow Corning Silicone Co., Ltd., Momentive Performance Materials Japan LLC., and WACKER ASAHIKASEI SILICONE CO., LTD.

When the surface protective layer 4 contains a fluororesin, the fluororesin may be, for example, a tetrafluoroethylene resin, a tetrafluoroethylene-ethylene copolymer, or polyvinylidenefluoride, and many derivatives other than these examples can also be used.

A fluororesin is widely known to exhibit minimum-level surface tension and is suitable as a stain-resistance material.

Examples of fluororesin makers include DAIKIN INDUSTRIES, LTD. and DuPont-Mitsui Fluorochemicals Co., Ltd.

The amount of the fluororesin contained in the surface protective layer 4 is preferably 10 parts by mass or more and 100 parts by mass or less. The amount is more preferably 20 parts by mass or more. Here, the fluororesin itself may be the curable resin.

As described above, the surface protective layer 4 of the decorative sheet 1 according to the first embodiment may contain at least one of a silicone-based component or a fluorine-based component. This enables the decorative sheet 1 to have improved stain resistance. The decorative sheet 1 having improved stain resistance can prevent viruses from remaining on the surface thereof for long periods and can therefore further improve the antiviral properties.

<Fluorochrome>

The fluorochrome 6 is a dye that emits light when irradiated with ultraviolet light.

In the first embodiment, one example is described in which the fluorochrome 6 is formed using fluorescein.

The added amount of the fluorescein in the surface protective layer 4 is in a range of 0.001 or more and 0.5 or less relative to 100 of solid content of the surface protective layer 4. This is because if the added amount of the fluorescein in the surface protective layer 4 is less than 0.001 relative to 100 of solid content of the surface protective layer 4, it is difficult to determine by visual inspection during irradiation with ultraviolet light whether the decorative sheet 1 has antimicrobial properties or antiviral properties. This is because if the added amount of the fluorescein in the surface protective layer 4 is more than 0.5 relative to 100 of solid content of the surface protective layer 4, the color derived from the fluorescein may be visible during irradiation with sunlight, depending on the color tone of a motif formed on the pattern layer 3.

<Method of Producing Decorative Sheet>

Hereinafter, a method of producing the decorative sheet 1 is described with reference to FIG. 1.

When the antiviral agent 5 is added to the surface protective layer 4 in the production of the decorative sheet 1 according to the first embodiment, the fluorochrome 6 is added to the surface protective layer 4. On the other hand, when no antiviral agent 5 is added to the surface protective layer 4, unlike the first embodiment, no fluorochrome 6 is added to the surface protective layer 4.

The first embodiment is one example of the present invention, and the present invention is not limited to the first embodiment and can, without departing from the technical idea of the present invention, be accomplished by embodiments other than this embodiment with various modifications made according to the design or the like.

Effects of First Embodiment

The decorative sheet 1 according to the first embodiment can exhibit the effects described below.

(1) The decorative sheet 1 includes the printing substrate layer 2, the pattern layer 3 laminated on one surface of the printing substrate layer 2, and the surface protective layer 4 laminated on a surface of the pattern layer 3 opposite to a surface facing the printing substrate layer 2, the surface protective layer 4 having the antiviral agent 5 and the fluorochrome 6 added thereto.

Therefore, by the fluorochrome 6 emitting light, the decorative sheet 1 can, nondestructively, be confirmed to have antiviral properties.

As a result, it is possible to provide the decorative sheet 1 that can, nondestructively, be confirmed to have antiviral properties by visual inspection.

(2) The fluorochrome 6 emits light when irradiated with ultraviolet light.

As a result, it is possible to provide a decorative sheet 1 that has designability with less discomfort when the environment for using the decorative sheet 1 is a typical one.

(3) The fluorochrome 6 is formed using fluorescein.

As a result, the added amount of the fluorochrome 6 need not be increased to confirm by visual inspection that the decorative sheet 1 has antiviral properties, and influence on other properties can therefore be reduced. In addition, increase of costs can be suppressed. Further, sufficient fluorescence can be emitted for confirming by visual inspection that the decorative sheet 1 has antiviral properties.

(4) The added amount of the fluorescein in the surface protective layer 4 is in a range of 0.001 or more and 0.5 or less relative to 100 of solid content of the surface protective layer 4.

As a result, it is easy to determine by visual inspection during irradiation with ultraviolet light that the decorative sheet 1 has antimicrobial properties or antiviral properties. In addition, it is possible to prevent the color, which is derived from fluorescein, from being visible during irradiation with sunlight.

The decorative material 10 according to the first embodiment can exhibit the effects described below.

(5) The decorative material 10 includes the substrate 7 and the decorative sheet 1 laminated on at least one surface of the substrate 7.

Therefore, by the fluorochrome 6 emitting light, the decorative sheet 1 can, nondestructively, be confirmed to have antiviral properties.

As a result, it is possible to provide the decorative material 10 that enables the decorative sheet 1 to be, nondestructively confirmed to have antiviral properties by visual inspection.

The method of producing the decorative sheet 1 according to the first embodiment can achieve the effects described below.

(6) When the antiviral agent 5 is added to the surface protective layer 4, the fluorochrome 6 is added to the surface protective layer 4. On the other hand, when no antiviral agent 5 is added to the surface protective layer 4, no fluorochrome 6 is added to the surface protective layer 4.

Therefore, by the fluorochrome 6 emitting light, the decorative sheet 1 can, nondestructively, be confirmed to have antiviral properties.

As a result, it is possible to provide a method of producing the decorative sheet 1, in which the decorative sheet 1 can, nondestructively, be confirmed to have antiviral properties by visual inspection.

Second Embodiment

Hereinafter, the structure of a decorative material 10 is described using FIG. 2 with reference to FIG. 1. Description of the same constitution as that of the first embodiment may be omitted.

Figure 2:
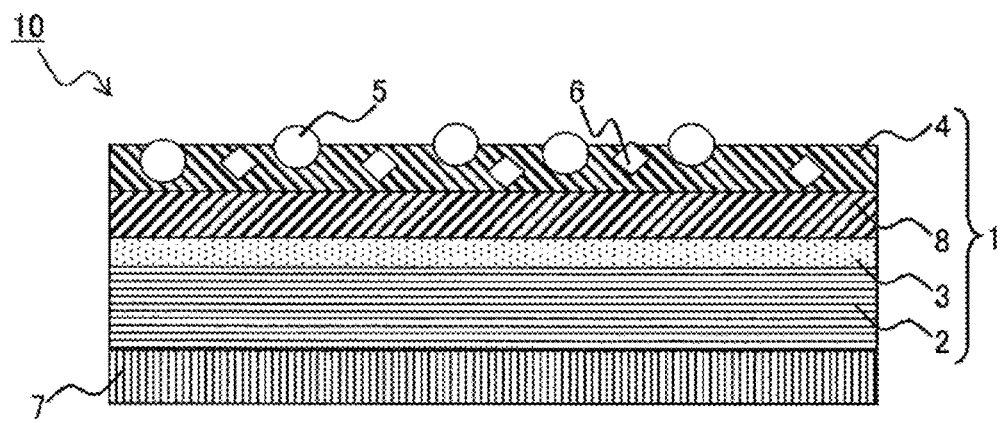
FIG. 2 is a cross-sectional view of a structure of a decorative sheet and a decorative material according to a second embodiment of the present invention.

As shown in FIG. 2, the decorative material 10 includes a decorative sheet 1 and a substrate 7.

Structure of Decorative Sheet

As shown in FIG. 2, the decorative sheet 1 includes a printing substrate layer 2, a pattern layer 3, an ultraviolet absorbing layer 8, and a surface protective layer 4.
<Ultraviolet Absorbing Layer>
The ultraviolet absorbing layer 8 is a layer disposed between the surface protective layer 4 and the pattern layer 3, and has an ultraviolet absorber added thereto.

As the ultraviolet absorber, it is possible to use, for example, "Tinuvin 400" manufactured by BASF Japan Ltd.

The second embodiment is one example of the present invention, but the present invention is not limited to the second embodiment and can, without departing from the technical idea of the present invention, be accomplished by embodiments other than this embodiment with various modifications made according to design or the like.

Effects of Second Embodiment

In addition to the effects of the first embodiment, the decorative sheet 1 according to the second embodiment can further exhibit the effects described below.
(1) The decorative sheet 1 further includes the ultraviolet absorbing layer 8 disposed between the surface protective layer 4 and the pattern layer 3, the ultraviolet absorbing layer 8 having the ultraviolet absorber added thereto.

As a result, it is possible to provide a decorative sheet 1 that can exhibit high fluorescence performance and weather resistance performance.

Third Embodiment

Hereinafter, the structure of a decorative material 10 is described using FIG. 3 with reference to FIG. 1. Description of the same constitution as that of the first embodiment may be omitted.

Structure of Decorative Sheet

Figure 3:
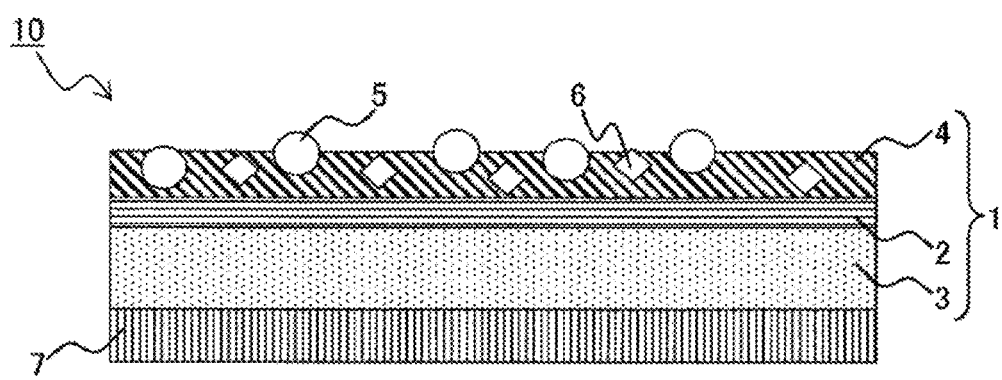
FIG. 3 is a cross-sectional view of a structure of a decorative sheet and a decorative material according to a third embodiment of the present invention.

As shown in FIG. 3, the decorative sheet 1 includes a pattern layer 3, a printing substrate layer 2, and a surface protective layer 4.

The structure of the third embodiment is the same as that of the first embodiment except that the printing substrate layer 2 is laminated on one surface (upper surface in FIG. 3) of the pattern layer 3, that the printing substrate layer 2 is formed using a transparent resin (e.g., a transparent polypropylene resin), and that the surface protective layer 4 is laminated on a surface (upper surface in FIG. 3) of the printing substrate layer 2 opposite to a surface facing the pattern layer 3.
<Method of Producing Decorative Sheet>
Hereinafter, a method of producing the decorative sheet 1 is described with reference to FIG. 3.

When an antiviral agent 5 is added to the surface protective layer 4 in the production of the decorative sheet 1 according to the third embodiment, a fluorochrome 6 is added to the surface protective layer 4. On the other hand, when no antiviral agent 5 is added to the surface protective layer 4, unlike the first embodiment, no fluorochrome 6 is added to the surface protective layer 4.

The third embodiment is one example of the present invention, but the present invention is not limited to the third embodiment and can, without departing from the technical idea of the present invention, be accomplished by embodiments other than this embodiment with various modifications made according to the design or the like.

Effects of Third Embodiment

In addition to the effects of the first embodiment, the decorative sheet 1 according to the third embodiment can further exhibit the effects described below.
(1) The decorative sheet 1 includes the pattern layer 3, the printing substrate layer 2 laminated on one surface of the pattern layer 3 and formed using a transparent resin, and the surface protective layer 4 laminated on a surface of the printing substrate layer 2 opposite to a surface facing the pattern layer 3, the surface protective layer 4 having the antiviral agent 5 and the fluorochrome 6 added thereto.

Therefore, by the fluorochrome 6 emitting light, the decorative sheet 1 can, nondestructively, be confirmed to have antiviral properties.

As a result, it is possible to provide the decorative sheet 1 that can, nondestructively, be confirmed to have antiviral properties by visual inspection.

The method of producing the decorative sheet 1 according to the third embodiment can achieve the effects described below.
(2) When the antiviral agent 5 is added to the surface protective layer 4, the fluorochrome 6 is added to the surface protective layer 4. On the other hand, when no antiviral agent 5 is added to the surface protective layer 4, no fluorochrome 6 is added to the surface protective layer 4.

Therefore, by the fluorochrome 6 emitting light, the decorative sheet 1 can, nondestructively, be confirmed to have antiviral properties.

As a result, it is possible to provide a method of producing the decorative sheet 1, in which the decorative sheet 1 can, nondestructively, be confirmed to have antiviral properties by visual inspection.

MODIFIED EXAMPLES (1) The surface protective layer 4 of the embodiments is constituted to contain the antiviral agent 5 but is not limited to this. The surface protective layer 4 may be constituted to contain an antimicrobial agent.

(2) The fluorochrome 6 is a dye that emits light when irradiated with ultraviolet light in the embodiments but is not limited to this dye. The fluorochrome 6 may be a dye that emits no light when irradiated with sunlight or a dye that emits light at a brightness undetectable by visual inspection when irradiated with sunlight.

(3) The decorative material 10 according to the embodiments has a structure including the decorative sheet 1 laminated on one surface of the substrate 7, but is not limited to this structure. That is, the decorative material 10 may have a structure including the decorative sheet 1 laminated on one surface as well as the other surface (lower surface in FIGS. 1 and 2) of the substrate 7.

EXAMPLES

Hereinafter, decorative materials of Examples 1 and 2 and Comparative Examples 1 to 3 are described with reference to the first and second embodiments.

Example 1

A printing substrate layer was formed at a thickness of 70 [1μm], using a colored polyethylene resin sheet.

A pattern layer was formed on one surface of the printing substrate layer by gravure printing, using a gravure printing ink (manufactured by TOYO INK CO., LTD.: "V351"). After formed, the pattern layer was aged for 1 day in a 40 [° C.] environment.

Thereafter, to one surface of the pattern layer, an anchor coating resin obtained by adding 20 parts by mass of a curing agent (manufactured by Mitsui Chemicals, Inc.: "TAKENATE A50") to 100 parts by mass of a base resin (manufactured by Mitsui Chemicals, Inc.: "TAKELAC A3210") was applied at an application amount of 1 [g/m$^2$] by gravure coating.

Further, 100 parts by mass of a transparent polypropylene resin (manufactured by Prime Polymer Co., Ltd.: "E139"), which had been subjected to weather resistance treatment, an adhesive functional group-containing polypropylene resin (manufactured by Mitsui Chemicals, Inc.: "QF551"), and the anchor coat were laminated by a co-extrusion lamination method such that the adhesive functional group-containing polypropylene resin and the anchor coat were adjacent to each other.

The weather resistance treatment was performed by melt-kneading the transparent polypropylene resin with 0.3 parts by mass of "Tinuvin 234" manufactured by BASF Japan Ltd. and 0.3 parts by mass of "Tinuvin 783" manufactured by BASF Japan Ltd.

The thickness of the layer formed by the co-extrusion lamination method was adjusted by adjusting the screw rotation speeds of the extruder such that the transparent polypropylene resin had a thickness of 60 [μm] and the adhesive functional group-containing polypropylene resin had a thickness of 10 [μm].

In addition, an adhesive functional group-containing polypropylene resin (manufactured by Mitsui Chemicals, Inc.: "QF551") layer was formed at a thickness of 10 [μm].

Then, a co-extrusion lamination process was performed such that the anchor coat, the adhesive functional group-containing polypropylene resin sheet, and the adhesive functional group-containing polypropylene resin layer were adjacent to each other.

Thereafter, the adhesive functional group-containing polypropylene resin layer was corona-treated, a surface protective layer was laminated on the corona-treated surface, and a decorative sheet of Examples 1 was thus formed. The composition of the surface protective layer is described below.

In the surface protective layer, a 30% solid-content acrylic coating agent (manufactured by DIC Corporation: "UC Clear") was used as a base material, and "Tinuvin 292" manufactured by BASF Japan Ltd. was added as a photo-stabilizer in an amount of 2 parts by mass relative to 100 parts by mass of the "UC clear". Further, "BIOSAIDO TB-B100" manufactured by TAISHO TECHNOS CO., LTD. was added as an antiviral agent (antimicrobial agent) formed using a silver-based material, in an amount of 2 parts by mass relative to 100 parts by mass of the "UC clear". In addition, "fluorescein" was added as a fluorochrome in an amount of 0.01 parts by mass relative to 100 parts of the "UC clear".

As the "fluorescein" used as a fluorochrome, fluorescein (CASNo: 2321-07-05, chemical formula: C20H1205) manufactured by FUJIFILM Wako Pure Chemical Corporation was used.

The application amount of the surface protective layer was 3 [g/m$^2$].

Example 2

A decorative sheet of Example 2 was formed in the same manner as in Example 1 except that a structure including an ultraviolet absorbing layer was employed.

As the ultraviolet absorbing layer, "UC Clear" was used as a base material, and "Tinuvin 400" manufactured by BASF Japan Ltd. was added as an ultraviolet absorber in an amount of 3 parts by mass relative to 100 parts by mass of the "UC clear". In addition, "Tinuvin 292" manufactured by BASF Japan Ltd. was added as a light stabilizer in an amount of 2 parts by mass relative to 100 parts by mass of the "UC clear".

The application amount of the ultraviolet absorbing layer was 3 [g/m$^2$].

Comparative Example 1

A decorative sheet of Comparative Example 1 was formed in the same manner as in Example 2 except that neither the antiviral agent nor the fluorochrome was added to the surface protective layer.

Comparative Example 2

A decorative sheet of Comparative Example 2 was formed in the same manner as in Example 1 except that no fluorochrome was added to the surface protective layer.

Comparative Example 3

A decorative sheet of Comparative Example 3 was formed in the same manner as in Example 2 except that no fluorochrome was added to the surface protective layer.

Performance Evaluation, Evaluation Results

The decorative materials of Examples 1 and 2 and Comparative Examples 1 to 3 having the structure shown in Table 1 were evaluated for designability, fluorescent state, and change in appearance. The evaluation methods described below were used.

TABLE 1

| | Ultraviolet absorbing layer | | | | Surface protective layer | | | | |
|---|---|---|---|---|---|---|---|---|---|
| | Base material UC clear | Ultraviolet absorber Tinuvin 400 | Photo-stabilizer Tinuvin 292 | Application amount | Base material UC clear | Light stabilizer Tinuvin 292 | Silver-based antimicrobial agent TB-B100 | Fluorochrome Fluorescein | Application amount |
| Example 1 | | | | | 100 | 2 | 2 | 0.01 | 3 g/m² |
| Example 2 | 100 | 3 | 2 | 3 g/m² | 100 | 2 | 2 | 0.01 | 3 g/m² |
| Comparative Example 1 | 100 | 3 | 2 | 3 g/m² | 100 | 2 | 0 | 0 | 3 g/m² |
| Comparative Example 2 | | | | | 100 | 2 | 2 | 0 | 3 g/m² |
| Comparative Example 3 | 100 | 3 | 2 | 3 g/m² | 100 | 2 | 2 | 0 | 3 g/m² |

<Designability>

The designability was evaluated by visually confirming the appearance.

<Fluorescent State>

The decorative sheet was irradiated with ultraviolet light (UV light) using "Handy UV Lamp SLUV-4" manufactured by AS ONE Corporation, and the fluorescent state of the surface protective layer was confirmed. Further, the decorative sheet was irradiated with sunlight, and the fluorescent state of the surface protective layer was confirmed. The fluorescent state was evaluated on the basis of these results.

<Change in Appearance>

A weather resistance test was performed using a sunshine weather meter (with black-panel temperature set to 63 [° C.] and irradiation time to 120 minutes, rainfall was performed for 12 minutes during the irradiation), and the change in appearance was confirmed every 500 hours in a weather-resistance test time of 500 hours to 2000 hours for evaluation.

TABLE 2

| | Appearance by visual inspection | Irradiation with UV light | Irradiation with sunlight | Sunshine weather resistance test | | | |
|---|---|---|---|---|---|---|---|
| | | | | 500 h | 1000 h | 1500 h | 2000 h |
| Example 1 | No difference in appearance | Fluorescent | Non-fluorescent | Appearance unchanged | Appearance unchanged | Slight color fading | Remarkable color fading |
| Example 2 | | Fluorescent | Non-fluorescent | Appearance unchanged | Appearance unchanged | Appearance unchanged | Appearance unchanged |
| Comparative Example 1 | | Non-fluorescent | Non-fluorescent | Appearance unchanged | Appearance unchanged | Appearance unchanged | Appearance unchanged |
| Comparative Example 2 | | Non-fluorescent | Non-fluorescent | Appearance unchanged | Appearance unchanged | Slight color fading | significant color fading |
| Comparative Example 3 | | Non-fluorescent | Non-fluorescent | Appearance unchanged | Appearance unchanged | Appearance unchanged | Appearance unchanged |

As a result of evaluating types of performance by the methods, the decorative materials of Examples 1 and 2 included, as shown in Table 2, a decorative sheet that fluoresced under ultraviolet light irradiation and for which it could be determined by visual inspection that the antimicrobial agent had been added. On the other hand, the decorative materials of Comparative Examples 1 to 3 included, as shown in Table 2, a decorative sheet that did not fluoresce when irradiated with ultraviolet light by the irradiation with ultraviolet light and for which it could not be determined by visual inspection that the antimicrobial agent had been added.

REFERENCE SIGNS LIST

1 . . . Decorative sheet; 2 . . . Printing substrate layer; 3 . . . Pattern layer; 4 . . . Surface protective layer; 5 . . . Antiviral agent; 6 . . . Fluorochrome; 7 . . . Substrate; 8 . . . Ultraviolet absorbing layer; 10 . . . Decorative material.

What is claimed is:

1. A decorative sheet, comprising:
   a printing substrate layer;
   a pattern layer laminated on one surface of the printing substrate layer; and
   a surface protective layer laminated on a surface of the pattern layer opposite to a surface facing the printing substrate layer,
   the surface protective layer having a fluorochrome, and at least one of an antimicrobial agent or an antiviral agent added thereto, wherein
   the fluorochrome is formed using fluorescein.

2. The decorative sheet of claim 1, further comprising an ultraviolet absorbing layer disposed between the surface protective layer and the pattern layer, wherein
   the ultraviolet absorbing layer has an ultraviolet absorber added thereto.

3. The decorative sheet of claim 1, wherein
   the fluorochrome emits light when irradiated with ultraviolet light.

4. The decorative sheet of claim 1,
   an added amount of the fluorescein in the surface protective layer is in a range of 0.001 or more and 0.5 or less relative to 100 of solid content of the surface protective layer.

5. A decorative material, comprising:
a substrate; and
the decorative sheet of claim 1 laminated on at least one surface of the substrate.

* * * * *